United States Patent Office 2,813,790
Patented Nov. 19, 1957

2,813,790
GOLD-COPPER-INDIUM BRAZING ALLOY

Walter L. Hack, San Carlos, Calif., assignor, by mesne assignments, to Western Gold & Platinum Company, Belmont, Calif., a corporation of California No Drawing. Application January 27, 1953,
Serial No. 333,599

2 Claims. (Cl. 75—165)

This invention relates to brazing alloys, and, more particularly to improvements in brazing alloys useful in the joining of members under elevated temperatures and high vacuum systems such as in the manufacture of electron tubes.

It is an object of the present invention to provide a new gold-copper alloy for use under conditions of elevated temperatures and high vacuum systems and wherein the gold content normally necessary to produce an alloy having a depressed melting point is reduced appreciably by the addition of the element indium.

It is a further object of the present invention to provide a new alloy, as aforesaid, and wherein the melting point of the alloy may be adjusted in accordance with the amount of indium and gold utilized in the alloy.

It is essential that brazing alloys used in the manufacture of electron tubes and like high vacuum systems have a low vapor pressure. Conventionally, the two types of alloys most commonly used for brazing vacuum tube components are a silver-copper eutectic alloy and various alloys of gold and copper ranging from 35% to 50% in gold content. The gold-copper alloys have a liquidus or flow point higher than that of the silver-copper eutectic alloy. Due to cost factors, the silver-copper alloy is used wherever possible, but there are certain conditions when a gold-copper alloy must be employed. For example, gold-copper alloys, having a lower vapor pressure and higher flow point, are utilized on brazed joints which are subjected to temperatures which would melt a silver-copper eutectic alloy or cause such alloy to produce excessive vapor.

Similarly, gold-copper alloys are utilized for brazing on glass sealing alloys and which sealing alloys are subject to embrittlement when brazed with the silver-copper eutectic alloy. Again, gold-copper alloys are utilized in so called "step brazing" techniques wherein assemblies are formed by two or more furnace brazing operations using successively lower flow point brazing alloys. As an example of step brazing, an assembly may first be partially formed by furnace brazing with a 35% gold-65% copper alloy having a liquidus of 1010° C. and a solidus of 970° C. and then the assembly may be completed with a silver-copper eutectic alloy having a liquidus and solidus of 779° C.

Further, where step brazing is employed in assemblies consisting of glass sealing alloys where a silver-copper eutectic alloy is not desirable, it has been common practice to make the first furnace braze with, say, a 35% gold-65% copper alloy and then use a 50% gold-50% copper alloy for the next braze on the assembly, and which second alloy has a liquidus of 950° C. and a solidus of 925° C. In view of the fact that there is only 25° C. between the solidus of the alloy of the first braze and the liquidus of the alloy of the second braze, it is necessary to exercise very careful control during application of the second braze in order to prevent overheating and resultant distortion of the joints formed by the first brazing operation.

The present invention comprises an alloy of gold, copper and indium, and which alloy is characterized by low vapor pressure and may be employed successfully for brazing glass sealing alloys such as "Kovar" and other metals used in vacuum tube construction. Again, the new alloy, containing up to 10% indium, is sufficiently ductile for brazing vacuum tube components.

Examples of the alloy are listed below:

| Example | Gold, percent | Copper, percent | Indium, percent | Liquidus, °C. | Solidus, °C. |
|---|---|---|---|---|---|
| #1 | 20 | 75 | 5 | 1,005 | 950 |
| #2 | 35 | 57.5 | 7.5 | 860 | 830 |
| #3 | 35 | 60 | 5 | 880 | 850 |
| #4 | 50 | 45 | 5 | 850 | 830 |
| #5 | 60 | 35 | 5 | 830 | 810 |
| #6 | 70 | 25 | 5 | 850 | 820 |

I have found that from 1% to 10% of indium in a gold-copper alloy reduces the melting point of the alloy appreciably. It is further noted that as the gold content of gold-copper alloys is increased the melting point of such alloy is reduced correspondingly. In the present invention, by the addition of indium, the gold content may be reduced while still maintaining a comparatively low melting point. Thus by increasing the indium and gold content a great decrease in alloy melting point may be effected. Similarly, where desirable, gold content may be reduced and the indium additive increased while still maintaining a relatively low melting point.

Thus Example #1, above, indicates that an alloy containing only 20% gold has a melting range approximating a conventional gold-copper alloy containing 35% gold.

The new alloy is extremely useful in step brazing operations where silver-copper alloys can not be utilized. One value of the alloy resides in the wide difference between the solidus of the gold-copper-indium alloy, such as Example #5 above, and the liquidus of any of the useful gold-copper alloys. It is noted that the liquidus point of the gold-copper alloys increases toward the melting point of copper with decreasing gold content. Since these alloys are widely used for brazing of copper parts, the lowest gold content alloy in common usage comprises 35% gold and 65% copper. Addition of indium to the gold-copper alloy permits usage of an alloy having considerably less than 35% gold while maintaining a melting range sufficiently low successfully to braze copper parts. Obviously, lower gold content alloys are of decided commercial value due to lower cost.

I have also found that a quantity of nickel may be added to the gold-copper-indium alloy to improve its wetability characteristics when the alloy is to be applied to metals such as tungsten. Although the addition of nickel increases the melting point of the alloy the addition of indium offsets the increase. Therefore, an alloy comprising gold, copper, nickel and indium may have desirable wetting characteristics while still retaining a low melting point for particular use in step brazing or similar applications where a relatively low melting point is desirable. Thus an alloy, consisting of between 20% to 70% by weight of gold, 1% to 5% by weight of nickel, 1% to 10% by weight of indium and the remainder copper, is satisfactory.

I claim:

1. A new brazing alloy for use under conditions of elevated temperature and high vacuum for application to parts previously brazed by one of the binary alloys of copper and gold, said new brazing alloy composed entirely of gold, copper and indium, said alloy comprising approximately 60% by weight of gold, approximately 5% by weight of indium, and the remainder copper.

2. A brazing alloy composed entirely of gold, copper, nickel and indium in the proportions of about 20% to 70% by weight of gold, about 1% to 10% by weight of indium, about 1% to 5% by weight of nickel, and the remainder copper.

References Cited in the file of this patent

UNITED STATES PATENTS

| | | |
|---|---|---|
| 2,400,003 | Hensel et al. | May 7, 1946 |
| 2,464,821 | Ludwick et al. | Mar. 22, 1949 |
| 2,503,564 | Reeve | Apr. 11, 1950 |
| 2,596,454 | Williams | May 13, 1952 |

OTHER REFERENCES

Product Engineering, October 1943. Pages 630–632.